United States Patent
Tolman et al.

(10) Patent No.: US 8,166,476 B2
(45) Date of Patent: Apr. 24, 2012

(54) ON-DEMAND ACCESS TO A VIRTUAL REPRESENTATION OF A PHYSICAL COMPUTER SYSTEM

(75) Inventors: Steven J. Tolman, Lehi, UT (US);
Shawn M. Holmstead, Lehi, UT (US);
H. Gregory Hubert, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1278 days.

(21) Appl. No.: 11/844,649

(22) Filed: Aug. 24, 2007

(65) Prior Publication Data

US 2009/0055822 A1    Feb. 26, 2009

(51) Int. Cl.
*G06F 9/455* (2006.01)
*G06F 13/28* (2006.01)
*G06F 11/00* (2006.01)

(52) U.S. Cl. ........... 718/1; 711/162; 714/13; 714/15
(58) Field of Classification Search ................ None
See application file for complete search history.

(56) References Cited

U.S. PATENT DOCUMENTS

| | | | |
|---|---|---|---|
| 7,127,491 B2 | 10/2006 | Zirnstein | |
| 7,162,628 B2 | 1/2007 | Gentil | |
| 7,346,623 B2 * | 3/2008 | Prahlad et al. ................ | 1/1 |
| 7,426,565 B1 | 9/2008 | Tormasov | |
| 7,448,079 B2 | 11/2008 | Tremain | |
| 7,464,194 B2 | 12/2008 | Saint-Hilaire | |
| 7,487,383 B2 * | 2/2009 | Bensinger .................... | 714/4.11 |
| 2003/0182326 A1 * | 9/2003 | Patterson ...................... | 707/204 |
| 2004/0254964 A1 * | 12/2004 | Kodama et al. ............... | 707/204 |

OTHER PUBLICATIONS

"Examining VMware," Jason Nieh et al., Aug. 2000, http://www.ncl.cs.columbia.edu/publications/drdobbs2000.pdf.
"Symantec pcAnywhere 12.0 Fact Sheet," Symantec Corp., Mar. 2006, http://eval.synnantec.com/mktginfo/enterprise/fact_sheets/ent-factsheet_pcanywhere_12.0_03-2006.en-us.pdf.
"Citrix GoToMyPC Fact Sheet," Citrix Systems, Inc., 2006, https://www.gotomypc.com/downloads/pdf/m/GoToMyPC_Corporate_Security_FAQs.pdf.
Symantec: "Norton Ghost Implementerungshandbuch" [Online] 1998-1999, pp. 5-176, XP002512638; winboard.org/forum/attachments/allgemeines/119d1030141982-xp-auf-neue-festplatte-kopieren-ghost.pdf.

(Continued)

Primary Examiner — Camquy Truong
(74) Attorney, Agent, or Firm — Meyertons, Hood, Kivlin, Kowert & Goetzel, P.C.

(57) ABSTRACT

Various embodiments of a system and method for accessing a virtual representation of a first physical computer system are disclosed. A first backup image of the first physical computer system may be stored on a server computer system, where the first backup image specifies a first state of the first physical computer system. In response to a request to access a virtual representation of the first physical computer system, a virtual computer may be instantiated from the first backup image on the server computer system. A state of the virtual computer may be modified in response to user input to the virtual computer. A second backup image of the virtual computer may be created, where the second backup image specifies the modified state of the virtual computer. The second backup image may be transferring and applied to the first physical computer system.

15 Claims, 11 Drawing Sheets

OTHER PUBLICATIONS

Alan Ed—Anonymous: "Software Deployment, Past, Present and Future" Future of Software Engineering, 2007, FOSE '07, IEEE, PI, May 1, 2007, pp. 269-284, XP031095735, ISBN: 978-0-7695-2820-8.

Rauch, F, et al: "Partition Repositories for Partition Cloning OS Independent Software Maintenance in Large Clusters of PCs", Cluster Computing, 2000. Proceedings. IEEE International Conference on Nov. 28-Dec. 1, 2000, Piscataway, NJ, IEEE, Nov. 28, 2000, pp. 233-242, XP010527278, ISBN: 978-0-7695-0896-2.

International Search Report in Application No. EP 08161578.3-2211 mailed Feb. 12, 2009.

* cited by examiner

ON-DEMAND ACCESS TO A VIRTUAL REPRESENTATION OF A PHYSICAL COMPUTER SYSTEM

BACKGROUND OF THE INVENTION

1. Field of the Invention

This invention relates to the fields of virtual computing and networked computer systems. More particularly, the invention relates to a system and method for on-demand remote access of a virtual representation of a physical computer system.

2. Description of the Related Art

Users commonly have one or more personal computer systems which they use to run various kinds of software applications and manage various types of information, e.g., for business and/or personal use. Examples of computer systems include desktop computer systems, laptops, or mobile devices such as personal digital assistants (PDA's), "smart" phones, gaming devices, etc. Users often need to access the software applications or data on their computer systems in various locations, e.g., wherever the user is currently located.

Accessing a fixed-location computer system such as a traditional desktop computer system from different locations is particularly problematic since these computer systems are usually not portable. This data access problem is reduced somewhat for mobile computer systems but is not resolved altogether. For example, users do not always carry their mobile computer systems with them everywhere they go. Also, if a mobile computer system becomes lost, stolen, or broken, the user is left without access to it.

SUMMARY

Various embodiments of a system and method for accessing a virtual representation of a first physical computer system are disclosed. According to one embodiment of the method, a first backup image of the first physical computer system may be stored on a server computer system, where the first backup image specifies a first state of the first physical computer system. In response to a request to access a virtual representation of the first physical computer system, a virtual computer may be instantiated from the first backup image on the server computer system. For example, in some embodiments, the request to access the virtual representation of the first physical computer system may be received from a second physical computer system. The server computer system may communicate with the second physical computer system to provide the second physical computer system with access to the virtual computer.

A state of the virtual computer may be modified in response to user input to the virtual computer. The method may further comprise storing a second backup image of the virtual computer on the server computer system, wherein the second backup image specifies the modified state of the virtual computer. The method may further comprise transferring and applying the second backup image from the server computer system to the first physical computer system. Applying the second backup image to the first physical computer system may put the first physical computer system in a second state corresponding to the modified state of the virtual computer.

BRIEF DESCRIPTION OF THE DRAWINGS

A better understanding of the invention can be obtained when the following detailed description is considered in conjunction with the following drawings, in which.

Figure 1:
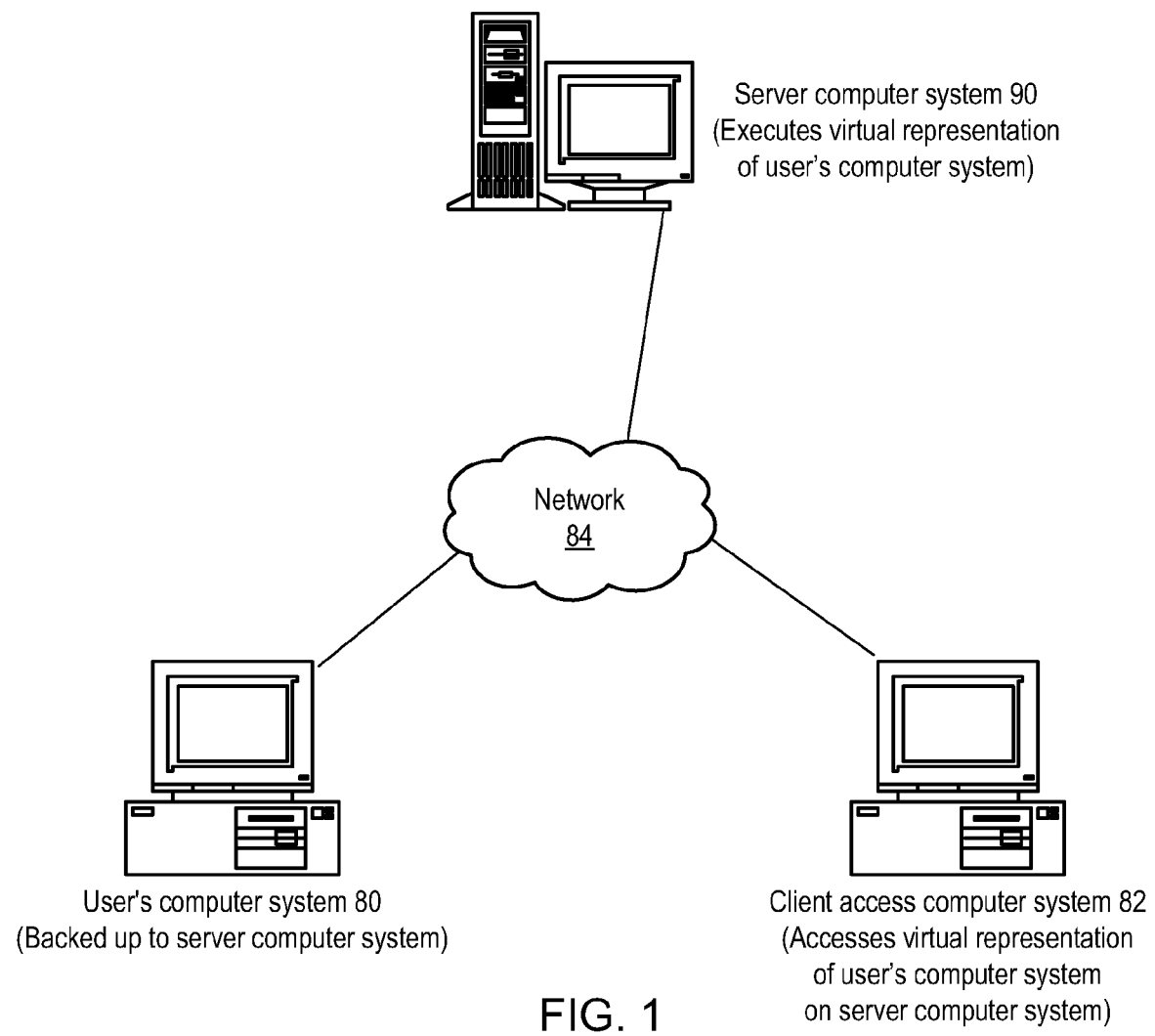
FIG. 1 illustrates one embodiment of a system for accessing a virtual representation of a physical computer system, where the system includes a user's computer system, a server computer system, and a client access computer system.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for accessing a virtual representation of a physical computer system are disclosed herein. FIG. 1 illustrates one embodiment of the system. In this example, the system includes a user's computer system 80, a server computer system 90, and a client access computer system 82. Briefly described, the method may comprise storing one or more backup images of the user's computer system 80 on the server computer system 90. Each respective backup image may represent the user's computer system 80 as it existed at a corresponding point in time, e.g., the time at which the respective backup image was created. For example, each backup image may specify respective state information, where the state information represents the state of the user's computer system 80 at the time at which the backup image was created.

The method may further comprise the server computer system 90 instantiating a virtual computer representing the user's computer system 80 in response to a user request received from the client access computer system 82. The virtual computer may be instantiated from one of the backup images of the user's computer system 80 stored on the server computer system 90. For example, the user may interact with the client access computer system 82 in order to log in to a service hosted by the server computer system 90 and select one of the backup images of the user's computer system 80. In response, the server computer system 90 may instantiate the virtual computer from the selected backup image.

The virtual computer may comprise a virtual representation of the user's computer system 80 as it existed at the time at which the selected backup image was created. For example, the selected backup image may be used to place the virtual computer in a state corresponding to the state in which the user's computer system 80 existed at the time the selected backup image was created. The user may interact with the virtual computer on the server computer system 90 via the client access computer system 82 similarly as if the user were interacting with the user's actual computer system 80 (as it existed at the time the selected backup image was created). For example, the selected backup image may include information specifying a state of a file system on the user's computer system 80, and the virtual computer may implement an identical file system based on this information. The selected backup image may also include information specifying a state of one or more software applications installed on the user's computer system 80, and the virtual computer may enable the user to run the one or more software applications on the virtual computer, where the one or more software applications function similarly or identically as if they were running on the user's actual computer system 80.

In response to the user interacting with the virtual computer, the state of the virtual computer may be modified. For example, where a file system of the user's computer system 80 is re-created on the virtual computer, the file system may be modified, e.g., in response to the user causing one or more files to be added, deleted, or modified. As another example, where a software application installed on the user's computer system 80 is executed on the virtual computer, a state of the software application or a state of data maintained by the software application may be modified in response to the user interacting with the software application on the virtual computer.

The method may further comprise storing a new backup image of the virtual computer on the server computer system, wherein the new backup image specifies the modified state of the virtual computer. For example, in some embodiments, after the user has finished interacting with the virtual computer, the user may log off from the server computer system 90. The server computer system 90 may create the new backup image based on the virtual computer and store the new backup image.

The method may further comprise transferring and applying the new backup image from the server computer system to the user's computer system 80. Applying the new backup image to the user's computer system 80 may put the user's computer system 80 in a state corresponding to the modified state of the virtual computer. For example, where the user interacted with the virtual computer to modify the file system, the file system on the user's computer system 80 may be modified accordingly. Similarly, where the user interacted with the virtual computer to modify a state of a software application or a state of data maintained by the software application, the software application or its associated data may be accordingly modified on the user's computer system 80.

As illustrated in FIG. 1, the user's computer system 80, the server computer system 90, and the client access computer system 82 may be different computer systems coupled via a network 84. For example, in some embodiments, each of these three respective computer systems may be geographically separated from each other, e.g., may be located in different rooms, different buildings, different locations within a city, different cities, or different countries, etc. As one example, in one embodiment the user's computer system 80 and the server computer system 90 may be located at different places within a given city, and the client access computer system 82 may be located in a different country. As another example, in one embodiment each of the three respective computer systems may be located at different places within a corporate campus complex.

In various embodiments, the network 84 may include any type of network or combination of networks. For example, the network 84 may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the user's computer system 80, the server computer system 90, and the client access computer system 82 may each connect to the network 84 using any type of wired or wireless connection medium. For example, wired mediums may include Ethernet, fiber channel, a modem connected to plain old telephone service (POTS), etc. Wireless connection mediums may include a wireless connection using a wireless communication protocol such an IEEE 802.11 (e.g., wireless Ethernet) protocol, a modem link through a cellular service, a satellite link, etc.

Various embodiments of the method may be used for various types of applications to provide users with remote access to a virtual representation of a physical device. As one example, consider a case in which the user's computer system 82 is a computer system located in his office at work. The user's computer system 82 may communicate with the server computer system 90 to store one or more backup images on the server computer system 90. For example, the server computer system 90 may be a server computer system managed by the user's employer or may be an off-site server computer system managed by a third party service provider.

Suppose that the user goes on vacation to another country and realizes that he needs to access a project planning software application on his computer system in his office at work. The user may connect to the server computer system 90, e.g., through the Internet, via a client access computer system 82. In some embodiments the client access computer system 82 may be any computer system capable of Internet access. For example, the client access computer system 82 may be a computer system at an Internet café in the country in which the user is vacationing or may be a portable computer system owned by the user, such as a laptop or cell phone.

Through the client access computer system 82, the user may request the server computer system 90 to instantiate a virtual computer from one of the backup images of the user's computer system 80 stored on the server computer system 90. Thus, the user may interact with the virtual computer via the client access computer system 82. In particular, in this example, the user may launch execution of the project planning software application on the virtual computer and may interact with the project planning software application through a graphical user interface displayed on the client access computer system 82. For example, the user may use the project planning software application to modify a project file or database.

After the user is finished using the project planning software application, the user may log off from the virtual computer and the server computer system 90. The server computer system 90 may create a backup image of the virtual computer and store it on the server computer system 90. The backup image of the virtual computer may include information specifying modifications made to the state of the virtual computer, e.g., in this example, may include information indicative of the modified project file or database.

In some embodiments, the user may later return to his office after vacation and interact with the user's computer system 80 in his office in order to log on to the server computer system 90 and request that the modifications he made while using the virtual computer when on vacation be applied to the user's computer system 80. Thus, the server computer system 90 may communicate with the user's computer system 80 to transfer to the user's computer system 80 the backup image that was previously created from the virtual computer. The user's computer system 80 may include software operable to automatically apply the transferred backup image to the user's computer system 80, e.g., in order to automatically put the user's computer system 80 in a state corresponding to the state that the virtual computer was in when the backup image was created. Thus, in this example, the file system on the user's computer system 80 may be automatically updated in order to reflect the modified project file or database, and other information maintained by the project planning software application may also possibly be modified in response to the backup image.

In other embodiments the user may not need to manually connect to the server computer system 90 and request that the backup image created from the virtual computer be transferred and applied to the user's computer system 80. For example, in some embodiments the server computer system 90 may automatically communicate with the user's computer system 80 to inform the user's computer system 80 that the new backup image was created on the server computer system 90, and the new backup image may be automatically transferred to and applied to the user's computer system 80. In other embodiments, the user's computer system 80 may automatically detect or be informed of the fact that the new backup image was created on the server computer system 90, but the user's computer system may first prompt the user asking whether he wants to apply the new backup image to the user's computer system 80 before doing so automatically.

Although the user's computer system 80 is illustrated in FIG. 1 as a desktop computer system, in various embodiments the user's computer system 80 may be any type of computer system and may have any of various form factors. Similarly, the server computer system 90 and the client access computer system 82 may also each be any type of computer system. In general, the term "computer system" refers to any device (or combination of devices) having at least one processor that executes instructions stored in memory. Examples of computer systems include personal computer systems (e.g., desktop computer systems, laptops, etc.), server computer systems, set-top boxes, gaming stations, and various mobile devices, such as personal digital assistants (PDA's), "smart" phones, etc.

It is also noted that although the user's computer system 80 is referred to herein as "the user's computer" system for convenience, in various embodiments this term may refer to any physical computer system, and the computer system does not necessarily belong to any specific user.

Figure 2:
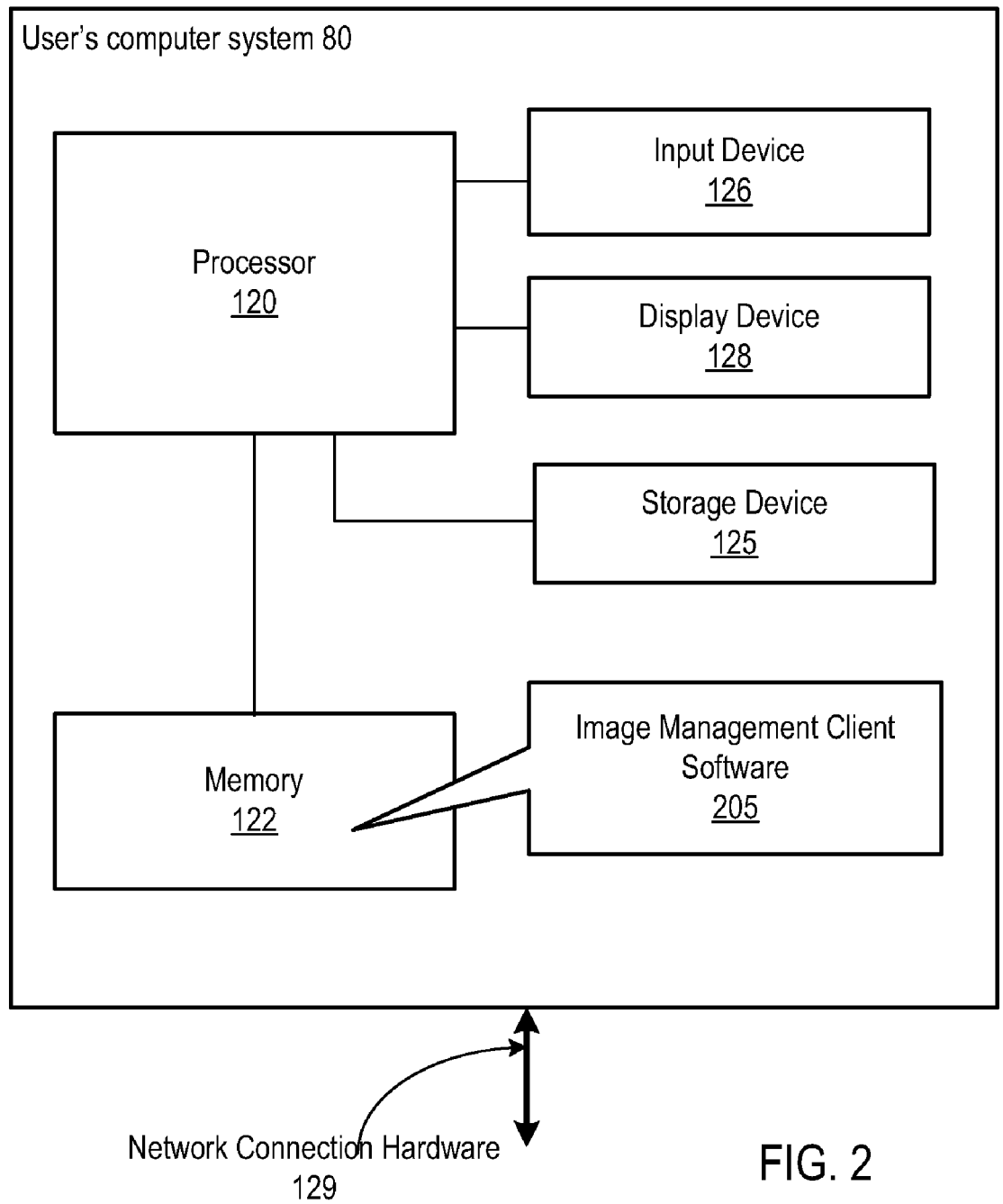
FIG. 2 illustrates an example of the user's computer system according to one embodiment.

FIG. 2 illustrates an example of the user's computer system 80 according to one embodiment. As noted above, the user's computer system 80 may comprise any type of computer system. In this example, the user's computer system 80 includes a processor 120 coupled to a memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store image management client software 205. The processor 120 may execute the image management client software 205 to perform various functions on the user's computer system 80 related to management of backup images. For example, the image management client software 205 may be executable to create backup images of the user's computer system 80, communicate with the server computer system 90 to send the backup images from the user's computer system 80 to the server computer system 90, receive backup images from the server computer system 90 (e.g., backup images of a virtual computer), and apply the received backup images to the user's computer system 80. The memory 122 may also store other software which operates in conjunction with or which is used by the image management client software 205, such as network communication software and operating system software.

In various embodiments the image management client software 205 may be implemented in any of various ways and may have any desired software architecture. For example, in some embodiments the image management client software 205 may be implemented as a single software application. In other embodiments the image management client software 205 may be implemented as two or more software programs or applications that operate in conjunction with each other.

Referring again to FIG. 2, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the user's computer system 80 may include multiple processors 120.

The user's computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system.

The user's computer system 80 may also include one or more input devices 126 for receiving user input from a user of the user's computer system 80. The input device(s) 126 may include any of various types of input devices, such as keyboards, keypads, microphones, or pointing devices (e.g., a mouse or trackball). The user's computer system 80 may also include one or more output devices 128 for displaying output to the user. The output device(s) 128 may include any of various types of output devices or display devices, such as LCD screens or monitors, CRT monitors, etc.

The user's computer system 80 may also include network connection hardware 129 through which the user's computer system 80 connects to the network 84. The network connection hardware 129 may include any type of hardware for coupling the user's computer system 80 to the network 84, e.g., depending on the type of network. As noted above, in various embodiments, the user's computer system 80 may be coupled to the server computer system 90 via any type of network or combination of networks.

Figure 3:
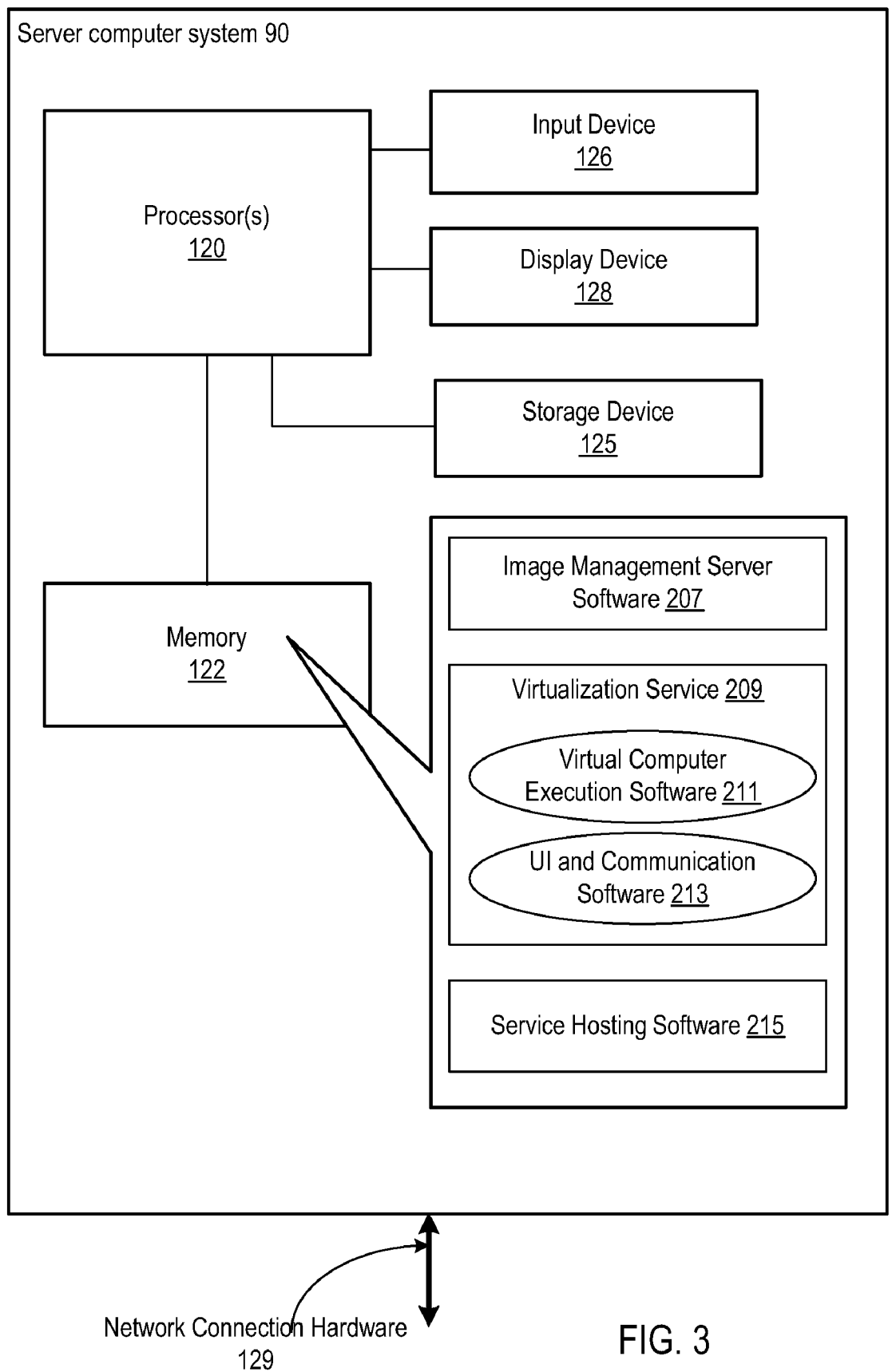
FIGS. 3 and 4 illustrate examples of the server computer system according to particular embodiments.

FIG. 3 illustrates an example of the server computer system 90 according to one embodiment. As noted above, the server computer system 90 may comprise any type of computer system. In this example, the server computer system 90 includes one or more processors 120 coupled to memory 122.

In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 of the server computer system 90 may be configured to store program instructions and/or data. In particular, the memory 122 may store image management server software 207. The processor 120 may execute the image management server software 207 to perform various functions on the server computer system 90 related to management of backup images. For example, the image management server software 207 may be executable to communicate with the image management client software 205 or other software on the user's computer system 80 to receive backup images from the user's computer system 80 and store the backup images, e.g., on one or more storage devices 125 of the server computer system 90. The image management server software 207 may also be executable to create a backup image from a virtual computer, e.g., where the virtual computer was instantiated from one of the backup images received from the user's computer system 80 and where the backup image created from the virtual computer reflects a modified state of the virtual computer. The image management server software 207 may also be executable to communicate with the image management client software 205 or other software on the user's computer system 80 to send the backup image created from the virtual computer to the user's computer system 80.

The memory 122 of the server computer system 90 may also store service hosting software 215. The service hosting software 215 may be executable to communicate with web browser software or other remote client access software executing on the client access computer system 82 to enable a user of the client access computer system 82 to connect to the server computer system 90 and request access to a virtual representation of the user's computer system 80. For example, in some embodiments the service hosting software 215 may include web server software enabling the web browser to connect to the server computer system 90 and provide identification and authentication information for the user. In response to receiving the identification and authentication information, the service hosting software 215 may provide HTML or other information enabling the web browser to display a user interface indicating the stored backup images previously received from the user's computer system 80.

The memory 122 of the server computer system 90 may also store virtualization service software 209. When the user of the client access computer system 82 selects one of the stored backup images from the user interface displayed in the web browser, the service hosting software 215 may request the virtualization service software 209 to instantiate a virtual computer from the selected backup image. In response, the virtualization service software 209 may instantiate the virtual computer and communicate with the web browser software or other remote client access software on the client access computer system 82 to enable the user of the client access computer system 82 to interact with the virtual computer.

In various embodiments the virtualization service software 209 may implement any of various kinds of virtualization environments and may communicate with the web browser software or other remote client access software on the client access computer system 82 according to any of various techniques to enable the user to interact with the virtual computer. In the embodiment illustrated in FIG. 3, the virtualization service software 209 includes virtual computer execution software 211 and UI/Communication software 213. The virtual computer execution software 211 may manage the instantiation and execution of the virtual computer. The UI/Communication software 213 may act as a middle agent between the virtual computer execution software 211 and the remote client access software on the client access computer system 82. For example, the UI/Communication software 213 may receive output information of the virtual computer from the virtual computer execution software 211 and may transform the output information into a form useable by the remote client access software to display a graphical user interface for the virtual computer on the client access computer system 82. The UI/Communication software 213 may also receive user input for the virtual computer from the remote client access software and pass the user input to the virtual computer execution software 211. The virtual computer executing under management of the virtual computer execution software 211 may then process the user input.

Referring again to FIG. 3, it is noted that the one or more processors 120 are representative of any type of processor. For example, in some embodiments, one or more of the processors 120 may be compatible with the x86 architecture, while in other embodiments one or more of the processors 120 may be compatible with the SPARC™ family of processors.

The server computer system 90 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system.

The server computer system 90 may also include one or more input devices 126 for receiving user input, as well as one or more output devices 128 for displaying output. The server computer system 90 may also include network connection hardware 129 through which the server computer system 90 connects to the network 84. The network connection hardware 129 may include any type of hardware for coupling the server computer system 90 to the network 84, e.g., depending on the type of network.

Figure 4:
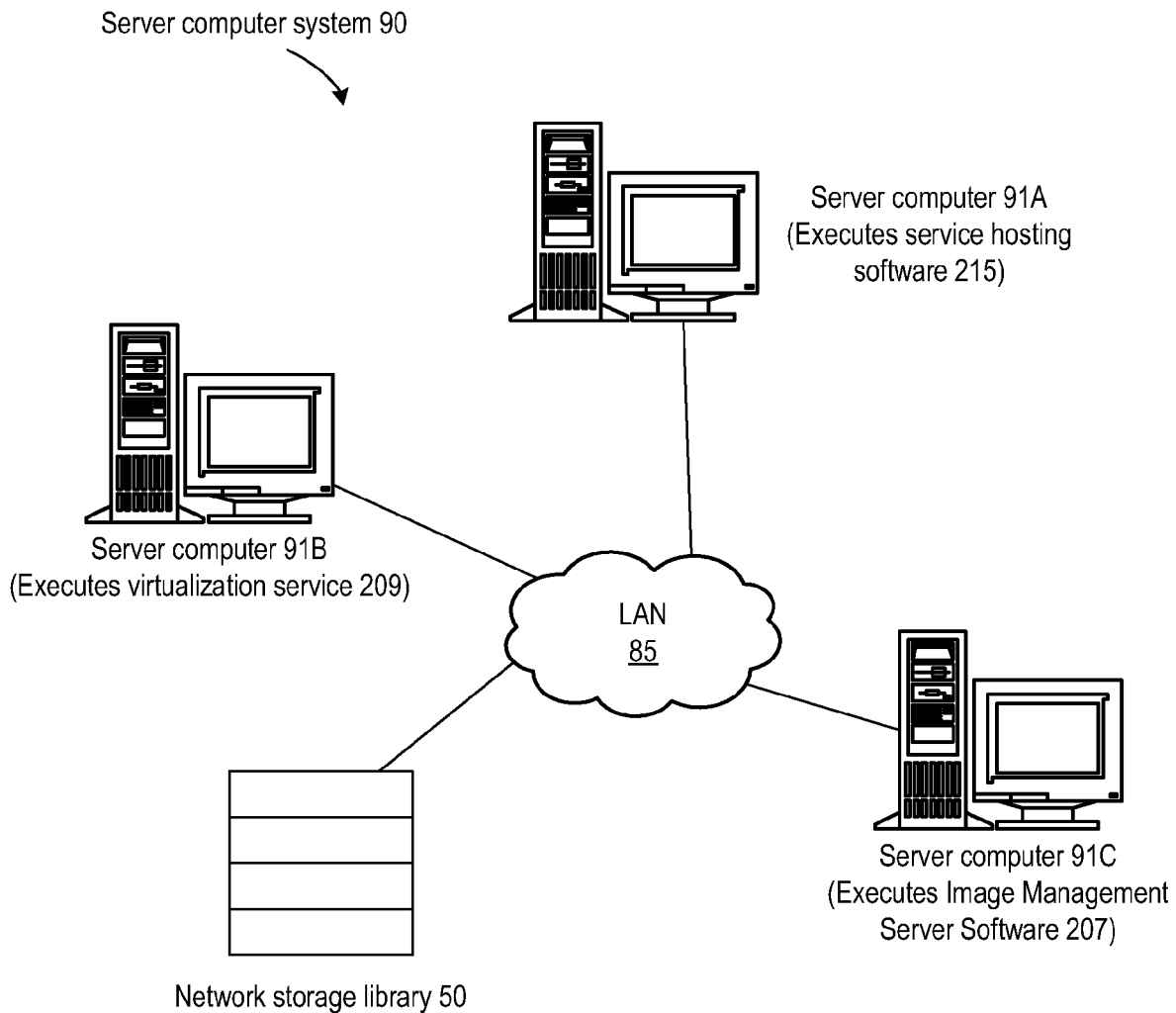

In some embodiments the server computer system 90 may include multiple computers, e.g., where the computers are coupled via a network. Thus, the functions of the server computer system 90 may be distributed across the multiple computers. For example, FIG. 4 illustrates an embodiment in which the server computer system 90 includes three server computers 91A, 91B, and 91C. In this example, the server computer 91A executes the service hosting software 215, the server computer 91B executes the virtualization service software 209, and the server computer 91C executes the image management server software 207. The server computers 91A, 91B, and 91C are coupled to each other through a local area network (LAN) 85. The server computers 91A, 91B, and 91C may communicate with each other in performing the various functions of the server computer system 90 described herein. In this example, a network storage library 50 is also connected to the LAN. One or more of the storage devices 125 of the server computer system 90 may be included in the network storage library 50. For example, the image management server software 207 executing on the server computer 91C may store backup images received from the user's computer system 80 on one or more storage devices 125 in the network storage library 50.

In various embodiments, the server computer system 90 may include any number of computers, and the various software components of the server computer system 90 may be distributed across the computers in any of various ways. For example, in some embodiments the virtualization service software 209 may be distributed across multiple computers in the server computer system 90. As another example, a single computer may execute both the virtualization service software 209 and the image management server software 207.

Figure 5:
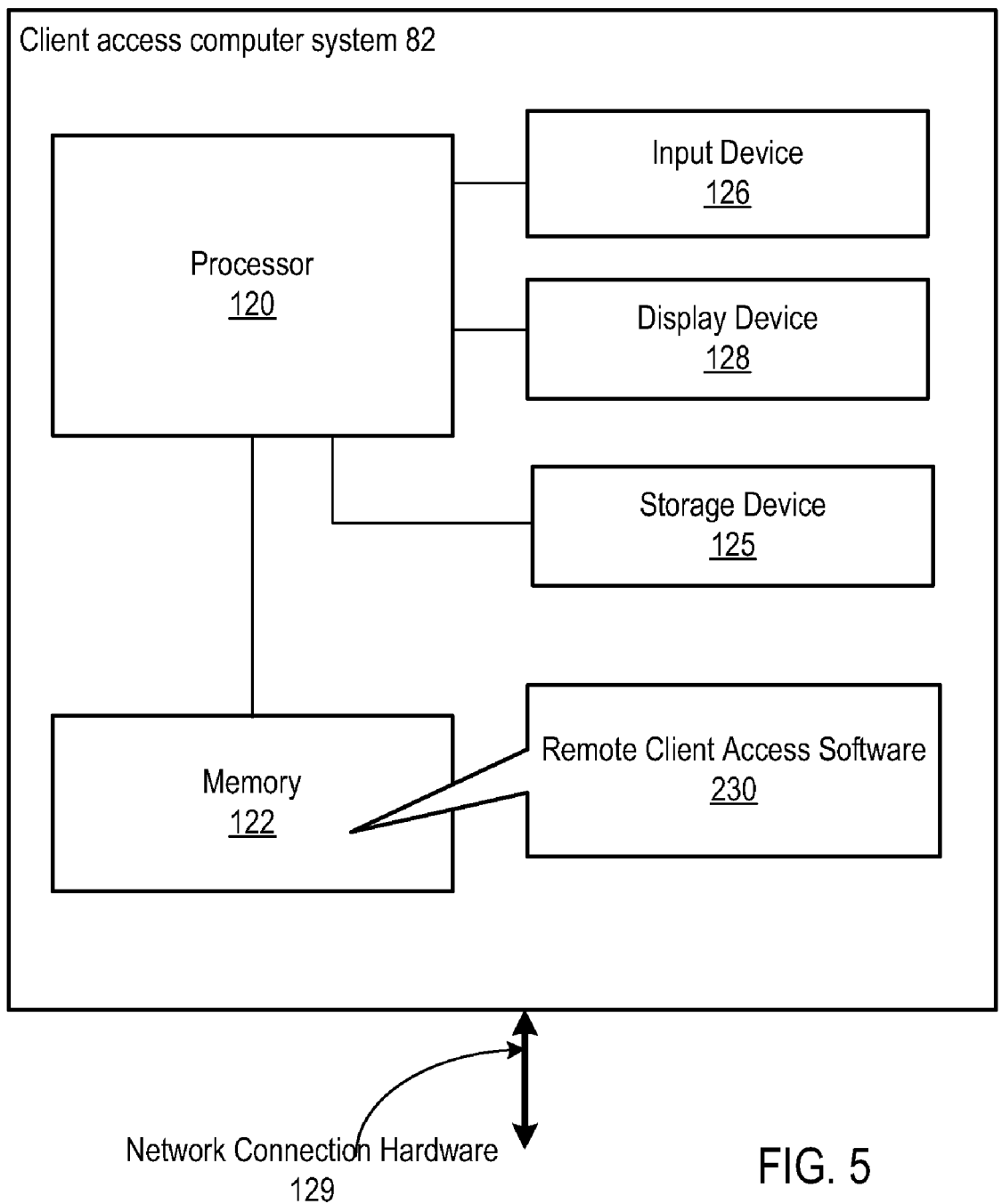
FIG. 5 illustrates an example of the client access computer system according to one embodiment.

Referring now to FIG. 5, an example of the client access computer system 82 according to one embodiment is illustrated. As noted above, the client access computer system 82 may comprise any type of computer system. The client access computer system 82 may include similar components such as described above. For example, in some embodiments the client access computer system 82 may include one or more processors 120, memory 122, network connection hardware 129, one or more input devices 126, one or more storage devices 125, and one or more display devices 128. The processor 120 may execute remote client access software 230 stored in the memory 122.

The remote client access software 230 may allow the client access computer system 82 to communicate with the server computer system 90. For example, the remote client access software 230 may communicate with the service hosting software 215 on the server computer system 90 to request a virtual computer to be instantiated from one of the backup images of the user's computer system 80. After the virtual computer has been instantiated, the remote client access software 230 may communicate with the virtualization service software 209, e.g., to receive user interface information for the virtual computer and display the user interface information on the client access computer system 82. The remote client access software 230 may also receive and pass user input to the virtual computer to the virtualization service software 209.

In various embodiments the remote client access software 230 may be implemented in any of various ways and may have any desired software architecture. For example, in some embodiments the remote client access software 230 may be implemented as a single software application. In other embodiments the remote client access software 230 may be implemented as two or more software programs or applications that operate in conjunction with each other.

In some embodiments, the remote client access software 230 may be a standard web browser program, and no other software may be required on the client access computer system 82. In other embodiments, the remote client access software 230 may also include a plug-in or extension for the web browser program. However, the web browser program may be operable to automatically download and install the plug-in, e.g., when the web browser program connects to a web page hosted by the server computer system 90. Thus, in some embodiments, virtually any computer system connected to the Internet may be used as the client access computer system 82.

In other embodiments, the client access computer system 82 may require additional configuration other than simply installing a standard web browser program. For example, in some embodiments the user or an administrator of the client access computer system 82 may be required to manually install a software application other than a standard web browser on the client access computer system 82, e.g., depending on the type of virtualization service software 209 used on the server computer system 90 or depending on the particular technique which the virtualization service software 209 uses to exchange information with the client access computer system 82.

Figure 6:
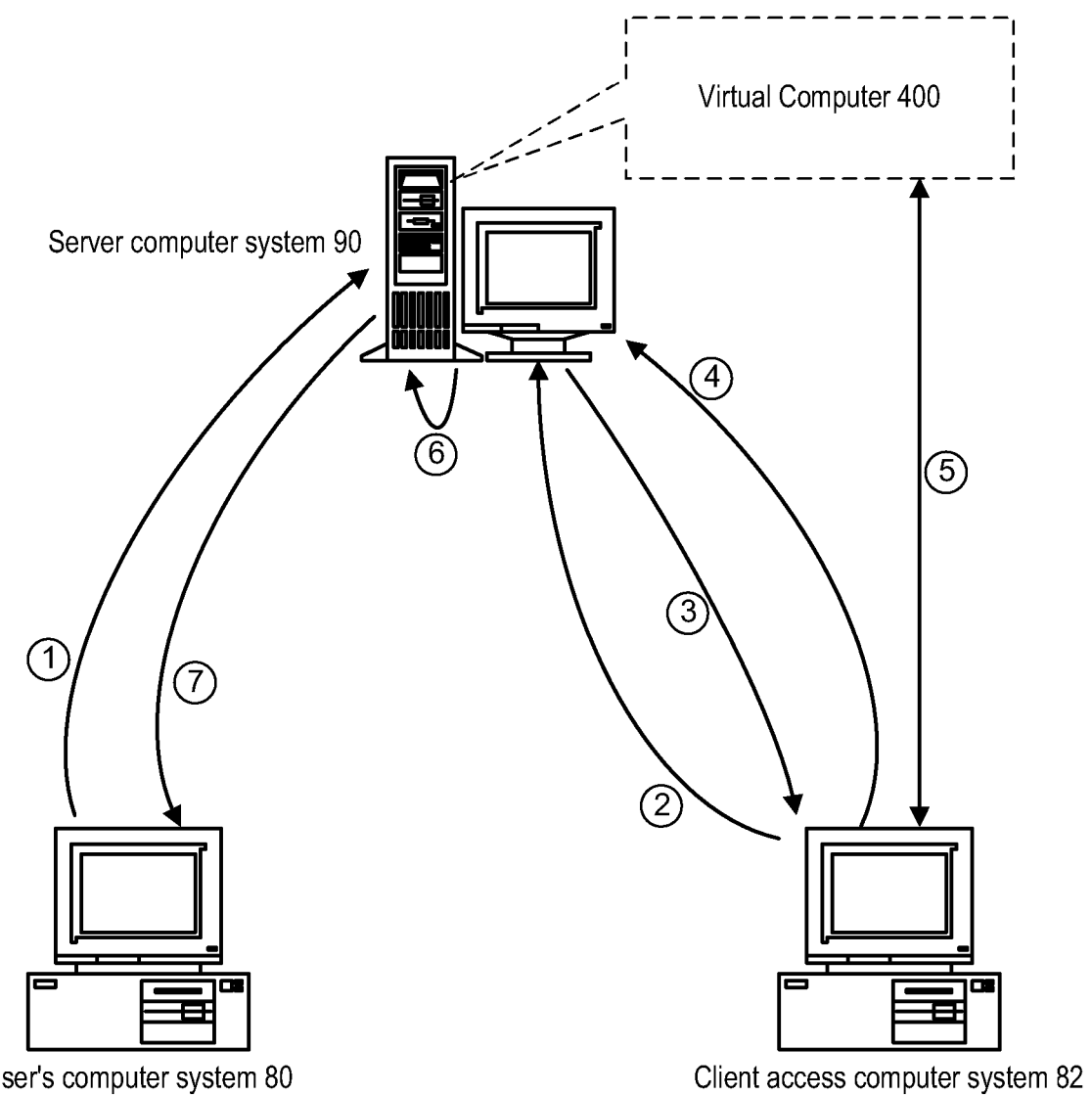
FIG. 6 illustrates one embodiment of a method for accessing a virtual representation of a physical computer system.

Referring now to FIG. 6 one embodiment of a method for accessing a virtual representation of a physical computer system is illustrated. As indicated by the arrow 1, one or more backup images of the user's computer system 80 may be sent to and stored on the server computer system 90. In some embodiments, the user may manually or interactively connect to the server computer system 90 and request the one or more backup images to be stored on the server computer system 90. In other embodiments, the one or more backup images may be automatically sent to and stored on the server computer system 90. For example, the user may configure the image management client software 205 installed on the user's computer system 80 to automatically create backup images of the user's computer system 80 according to a desired schedule (e.g., hourly, daily, weekly, or at other specified times). Each time a new backup image is created, the image management client software 205 may automatically communicate with the image management server software 207 on the server computer system 90 to send the new backup image for storage on the server computer system 90.

In some embodiments, the one or more backup images may be stored on the server computer system 90 in association with information identifying the user. For example, the user may create an account on the server computer system 90 by specifying identification and authentication information, such as a username and password. When each backup image is sent from the user's computer system 80 to the server computer system 90, the user's identification and authentication information may also be sent. The server computer system 90 may use this information to authorize access to the user's account and may store the received backup images in association with the user's account. Thus, the server computer system 90 may be configured to store backup images of a plurality of different user computer systems, e.g., for different user accounts, where the respective identification and authentication information for the various users is used to control access to the user accounts.

As discussed above with reference to FIG. 2, the user's computer system 80 includes or is coupled to one or more storage devices 125, such as disk drives, tape drives, optical storage devices, flash memory devices, etc. Each backup image of the user's computer system 80 includes file system information for one or more file systems implemented on the one or more storage devices 125. For example, each backup image may include at least a subset of the files stored on one or more of the storage devices 125. In some embodiments, a backup image may include a full backup of all of the files stored on one or more of the storage devices 125. In some embodiments, a backup image may include a full backup of all of the files stored on all of the storage devices 125. The user may be able to configure the image management client software 205 to perform a full or partial backup of each storage device 125.

The file system information included in each respective backup image may enable one or more of the file systems implemented on the one or more storage devices 125 to be re-created on a virtual computer on the server computer system 90 when the virtual computer is instantiated on the server computer system 90. Each respective file system may be either fully or partially re-created on the virtual computer, e.g., depending upon whether the backup image includes a full or partial backup of the respective file system.

Each backup image may include information enabling a virtual representation of the user's computer system 80 to be instantiated. In particular, each backup image may include operating system information for the user's computer system 80, e.g., where the operating system information is stored in the form of one or more files implementing the operating system or managed by the operating system. The operating system information may enable the operating system to be instantiated on the virtual computer on the server computer system 90.

In some embodiments, each backup image may include software application information, e.g., files or other information representing one or more software applications installed on the user's computer system 80. The software application information may enable the one or more software applications to be executed on the virtual computer on the server computer system 90.

In some embodiments, each backup image may also include device information, e.g., device driver files or other information representing devices in the user's computer system 80 or indicating a configuration of devices in the user's computer system 80. The device information may enable one or more of the devices in the user's computer system 80 to be simulated by the virtual computer on the server computer system 90.

Each backup image of the user's computer system 80 represent the user's computer system 80 as it existed at a corresponding point in time, e.g., the time at which the respective backup image was created. For example, each backup image may specify respective state information, where the state information represents the state of the user's computer system 80 at the time at which the backup image was created. As described above, the state information may include information such as file system information representing a state of a file system of the user's computer system 80, operating system information representing a state of an operating system of the user's computer system 80, software application information representing a state of one or more software applications on the user's computer system 80, etc.

In some embodiments, one or more of the backup images of the user's computer system 80 may be created as an incremental backup based on another backup image. For example, the image management client software 205 on the user's computer system 80 may first create a base backup image, which is an independent backup image that does not depend on any other backup image. For example, the base backup image may include a full backup of the data stored on a storage device 125. At a later time, the image management client software 205 may create an incremental backup image which depends on the base backup image. The incremental backup image may not include a full backup of the data on the storage device 125, but may instead specify changes to the data that have occurred since the base backup image was created. For example, an incremental backup image may include new data that has been added or data that has changed since the base backup image was created, but may not include data that has not changed since the base backup image was created. At a later time, the image management client software 205 may create another incremental backup image which depends on the first incremental backup image. For example, the second incremental backup image may specify changes to the data that have occurred since the first incremental backup image was created.

Figure 7:
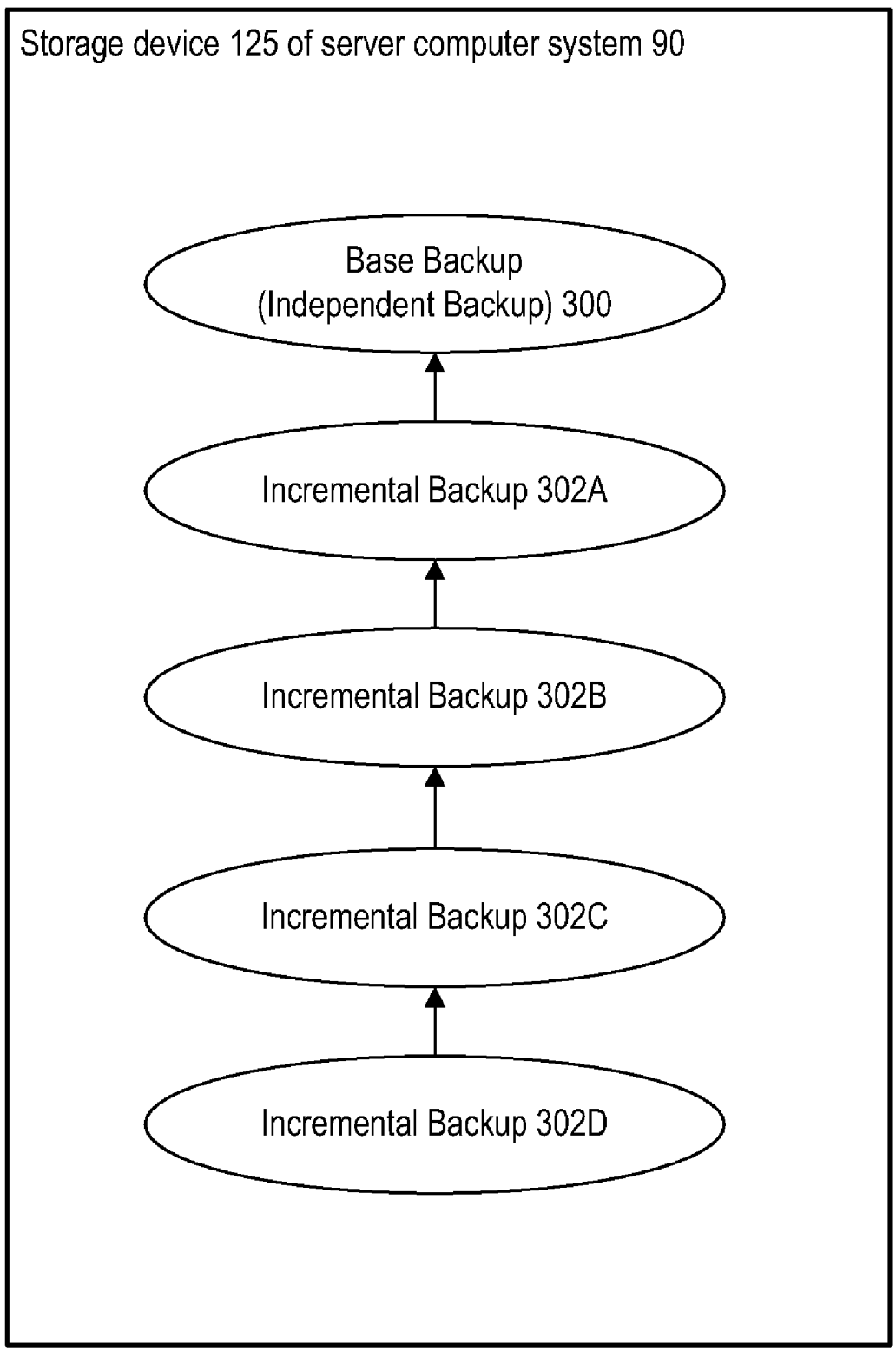
FIG. 7 illustrates an example in which a base backup image of the user's computer system and a plurality of incremental backup images of the user's computer system have been sent to and stored on a storage device of the server computer system.

Thus, in some embodiments a chain including a base backup image 300 of the user's computer system 80 and one or more incremental backup images 302 of the user's computer system 80 may be created and stored on the server computer system 90. For example, FIG. 7 illustrates an example in which a base backup image 300 of the user's computer system 80 has been sent to and stored on a storage device 125 of the server computer system 90. The base backup image 300 may represent the state of the user's computer system 80 as it existed at a time T=T1. Four incremental backup images 302A-302D of the user's computer system 80 have also been sent to and stored on the storage device 125 of the server computer system 90. The incremental backup image 302A depends on the base backup image 300 and represents the state of the user's computer system 80 as it existed at a time T=T2 (where T2 is after T1). Similarly, the incremental backup image 302B depends on the incremental backup image 302A and represents the state of the user's computer system 80 as it existed at a time T=T3 (where T3 is after T2). The incremental backup images 302C and 302D represent further incremental backups in the chain. The server computer system 90 may store information indicating the respective dependencies among the backup images stored on the storage device 125, as well as information indicating the respective times at which the backup images were created.

Figure 8:
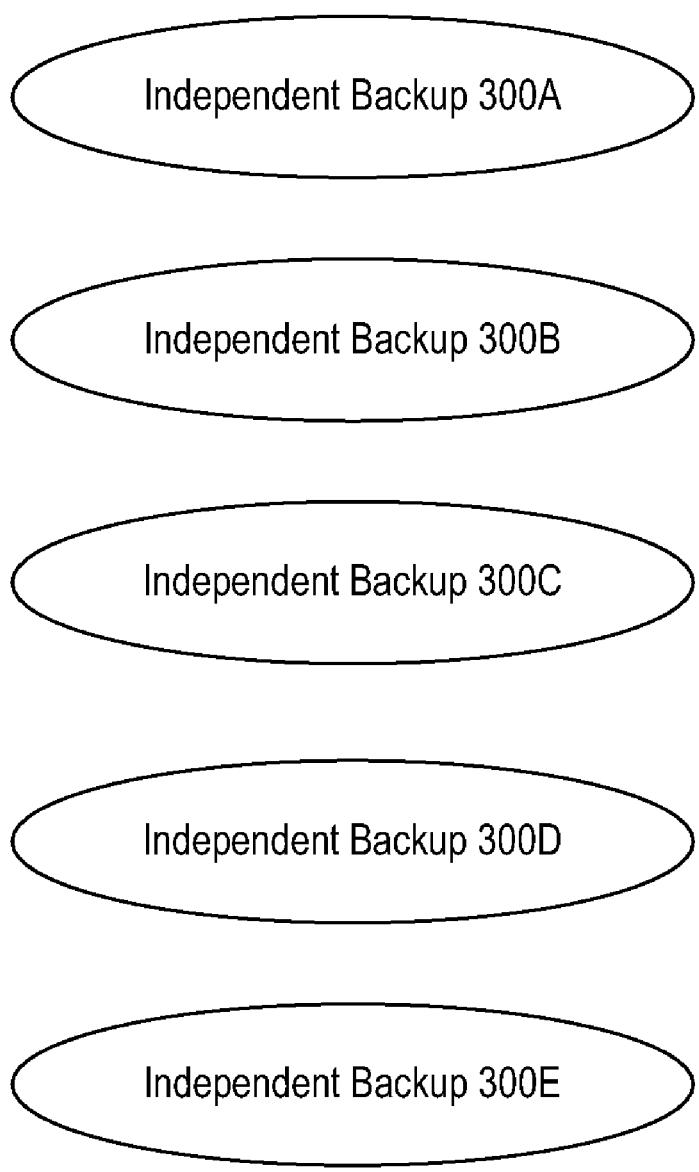
FIG. 8 illustrates an example in which a plurality of independent backup images have been sent to and stored on a storage device of the server computer system.

In other embodiments, two or more independent or base backups 300 of the user's computer system 80 may be created and sent for storage on the server computer system 90. For example, FIG. 8 illustrates an example in which five independent backup images 300A-300E have been stored on the storage device 125 of the server computer system 90. Each of the independent backup images 300 are independent of each other.

In other embodiments, a plurality of base backup images 300 and a plurality of incremental backup images 302 may be created and stored on the server computer system 90, such that each respective base backup image 300 has one or more incremental backup images 302 that depend on the respective base backup image 300.

After the one or more backup images of the user's computer system 80 have been stored on the server computer system 90, a user of a client access computer system 82 may desire to access a virtual representation of the user's computer system 80, e.g., where the client access computer system 82 is located remotely from both the user's computer system 80 and the server computer system 90. For example, as illustrated in arrow 2 of FIG. 6, the user may interact with web browser software or other remote client access software 230 on the client access computer system 82 to communicate with the service hosting software 215 on the server computer system 90. For example, the user may input an address of the server computer system 90, such as a URL (Uniform Resource Locator) for a web page hosted by the server computer system 90.

Figure 9:
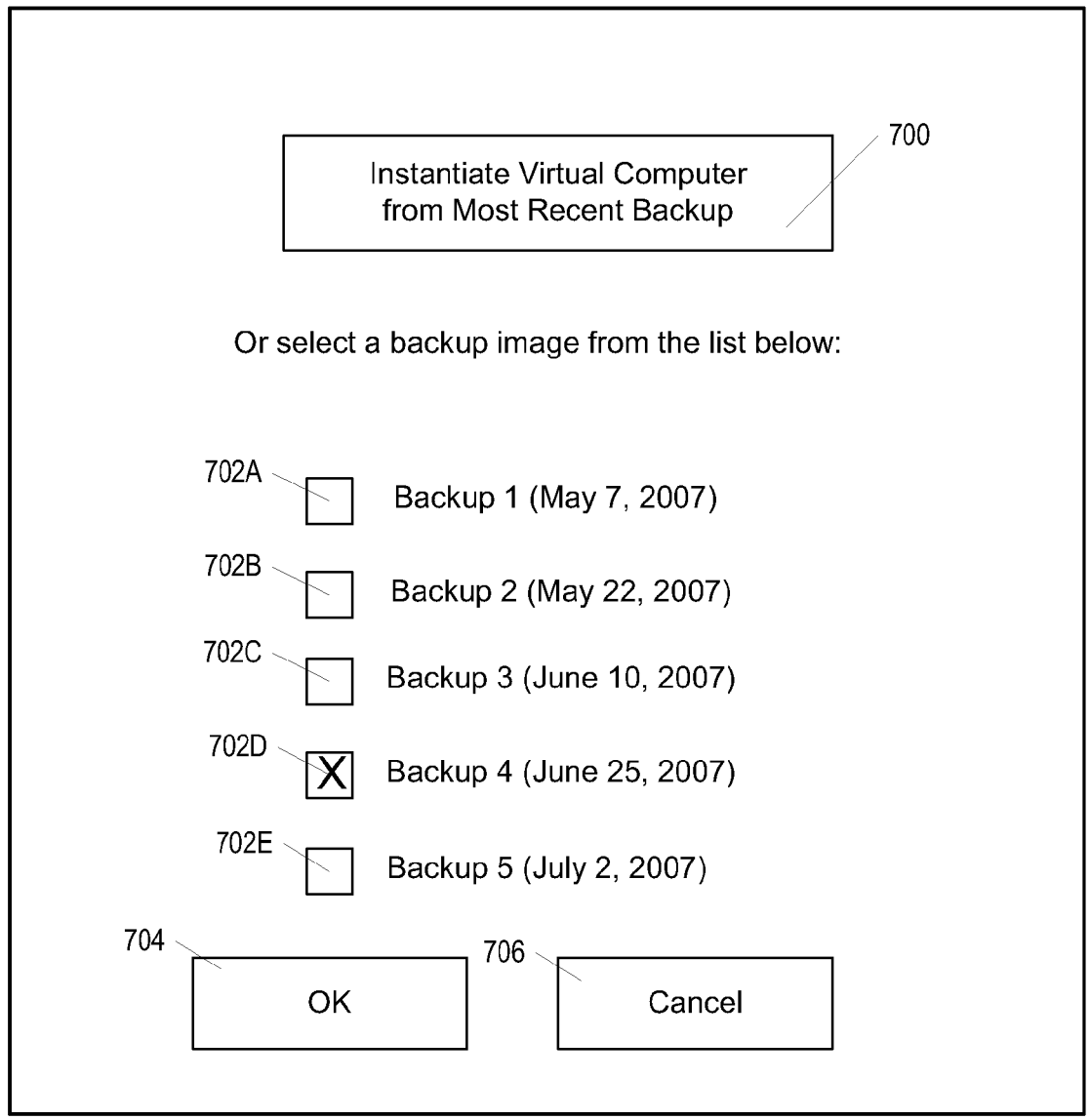
FIG. 9 illustrates an example of a user interface displayed on the client access computer system, where the user interface allows a user to select one of the backup images stored on the server computer system.

In some embodiments, the service hosting software 215 may prompt the user to enter identification and authentication information, such as a username and password. After authenticating the user, the service hosting software 215 may send information to the remote client access software 230 enabling the remote client access software 230 to display a user interface indicating the one or more backup images associated with the user that are stored on the server computer system 90, as indicated by arrow 3 of FIG. 6. In some embodiments the user interface may be displayed as a web page. FIG. 9 illustrates a simple example of a web page or other type of user interface that may be displayed on the client access computer system 82. In this example, the user interface includes a button 700 which the user may click to request a virtual computer to be instantiated from the most recent backup image of the user's computer system that has been stored on the server computer system 90. The user interface also lists each of the backup images and the respective times at which the backup images were created. A respective checkbox 702A-702E is displayed next to each of the listed backup images. The user may check the checkbox next to the desired backup image from which he wants the virtual computer to be instantiated and click the OK button 704. In other embodiments, the user interface displayed on the client access computer system 82 may have any of various other appearances and may enable the user to select a desired backup image in any of various ways.

Thus, the system may enable different virtual representations of the user's computer system to be instantiated wherein each respective virtual representation corresponds to a state of the user's computer system as it existed at a respective point in time, e.g., the points in time at which the respective backup images were created.

Referring again to FIG. 6, the remote client access software 230 may send information indicating which backup image the user selected to the service hosting software 215 on the server computer system 90, as indicated by arrow 4 of FIG. 6. In response, the service hosting software 215 may request the virtualization service 209 to instantiate a virtual computer from the selected backup image.

In response, the virtualization service 209 may retrieve the selected backup image from storage and instantiate a virtual computer 400 from the backup image, as indicated in FIG. 6. The virtual computer 400 is a virtual representation of the user's computer system 80 as it existed at the time the selected backup image was created, e.g., where the virtual representation is implemented by software (e.g., the virtual computer execution software 211) executing on the server computer system 90. When the virtual computer 400 is initially instantiated, the virtual computer 400 may be in a state corresponding to the state of the user's computer system 80 at the time the selected backup image was created.

For example, the selected backup image may include operating system information enabling an operating system for the virtual computer 400 to be instantiated, e.g., where the operating system executes under management of the virtual computer execution software 211. The operating system may have an initial state corresponding to the state of the operating system on the user's computer system 80 at the time the selected backup image was created.

Similarly, the selected backup image may include file system information enabling a file system of the user's computer system 80 to be re-created on the virtual computer 400, e.g., where the file system is managed by the virtual computer execution software 211. The file system may have an initial state corresponding to the state of the file system on the user's computer system 80 at the time the selected backup image was created.

Similarly, the selected backup image may include software application information enabling a software application installed on the user's computer system 80 to be replicated on the virtual computer 400, e.g., where execution of a software application is managed by the virtual computer execution software 211. The software application may have an initial state corresponding to the state of the software application on the user's computer system 80 at the time the selected backup image was created.

In various embodiments, the virtualization service software 209 may implement any of various kinds of virtualization environments, and the virtual computer 400 may be implemented as any of various types of virtual computers. In some embodiments, the selected backup image may be represented as one or more files, and the virtualization service software 209 may be operable to automatically convert the one or more files of the selected backup image into a second one or more files, e.g., where the second one or more files are formatted according to a virtual computer format. Thus, the virtual computer 400 may be instantiated from the second one or more files. In some embodiments, the one or more files of the selected backup image may be dynamically converted into the second one or more files in the virtual computer format at the time the request to instantiate the virtual computer 400 is received. In other embodiments, the one or more files of the selected backup image may be pre-converted into the second one or more files in the virtual computer format before the request to instantiate the virtual computer 400 is received. Thus, in some embodiments the second one or more files in the virtual computer format may be pre-stored on the server computer system 90.

In some embodiments the server computer system 90 may be operable to instantiate different kinds of virtual computers, e.g., may implement different kinds of virtual computing frameworks or environments. In some embodiments the server computer system 90 may enable the user to select a type of virtual computer that he wants to instantiate. Thus, the virtual computer 400 may be instantiated as the type of virtual computer selected by the user.

Referring again to FIG. 6, after the virtual computer 400 has been instantiated on the server computer system 90, the UI/Communication software 213 of the virtualization service 209 may communicate with the remote client access software 230 on the client access computer system 82, as indicated by the double-headed arrow 5. For example, the UI/Communication software 213 may receive output information of the virtual computer 400 from the virtual computer execution software 211 and may transform the output information into a form useable by the remote client access software 230 to display a graphical user interface for the virtual computer 400 on the client access computer system 82. In some embodiments the graphical user interface displayed on the client access computer system 82 may look very similar or nearly identical to the graphical user interface that the user sees when interacting with the user's actual computer system 80. For example, the user may see the same icons as he would on the user's actual computer system 80, where the icons are arranged in the same layout.

The UI/Communication software 213 may also receive user input for the virtual computer 400 from the user of the client access computer system 82 via the remote client access software 230 and may pass the user input to the virtual computer execution software 211. The virtual computer 400 executing under management of the virtual computer execution software 211 may then process the user input.

As the user interacts with the virtual computer 400 through the client access computer system 82, the state of the virtual computer 400 may be modified. For example, if the user adds, deletes, or modifies a file (or executes a software application on the virtual computer 400 the results in a file addition, deletion, or modification) then the state of the file system on the virtual computer 400 may be modified. As another example, if the user changes configuration options for the operating system or for a software application on the virtual computer 400 then the state of the operating system or software application may be modified.

The graphical user interface on the client access computer system 82 may enable the user to indicate when the user has finished interacting with the virtual computer 400. In response, the remote client access software 230 may disconnect from the virtual computer 400 and the server computer system 90. In some embodiments, the server computer system 90 may bill the user's credit card or otherwise charge the user for his use of the virtualization service on the server computer system 90.

As indicated by arrow 6 of FIG. 6, the server computer system 90 may create a new backup image of the virtual computer 400 and store the new backup image on a storage device 125 of the server computer system 90. The new backup image may specify the modified state of the virtual computer 400.

In various embodiments the new backup image may be created from the virtual computer 400 using any of various techniques. For example, in some embodiments, the virtual computer 400 may be represented as information stored in dynamic memory on the server computer system 90, and the new backup image may be created from the information stored in dynamic memory. In other embodiments, the information stored in dynamic memory may first be converted into one or more files representing the virtual computer 400, and the one or more files may then be automatically converted into a second one or more files, e.g., where the second one or more files are formatted according to a backup format for physical devices.

Figure 10:
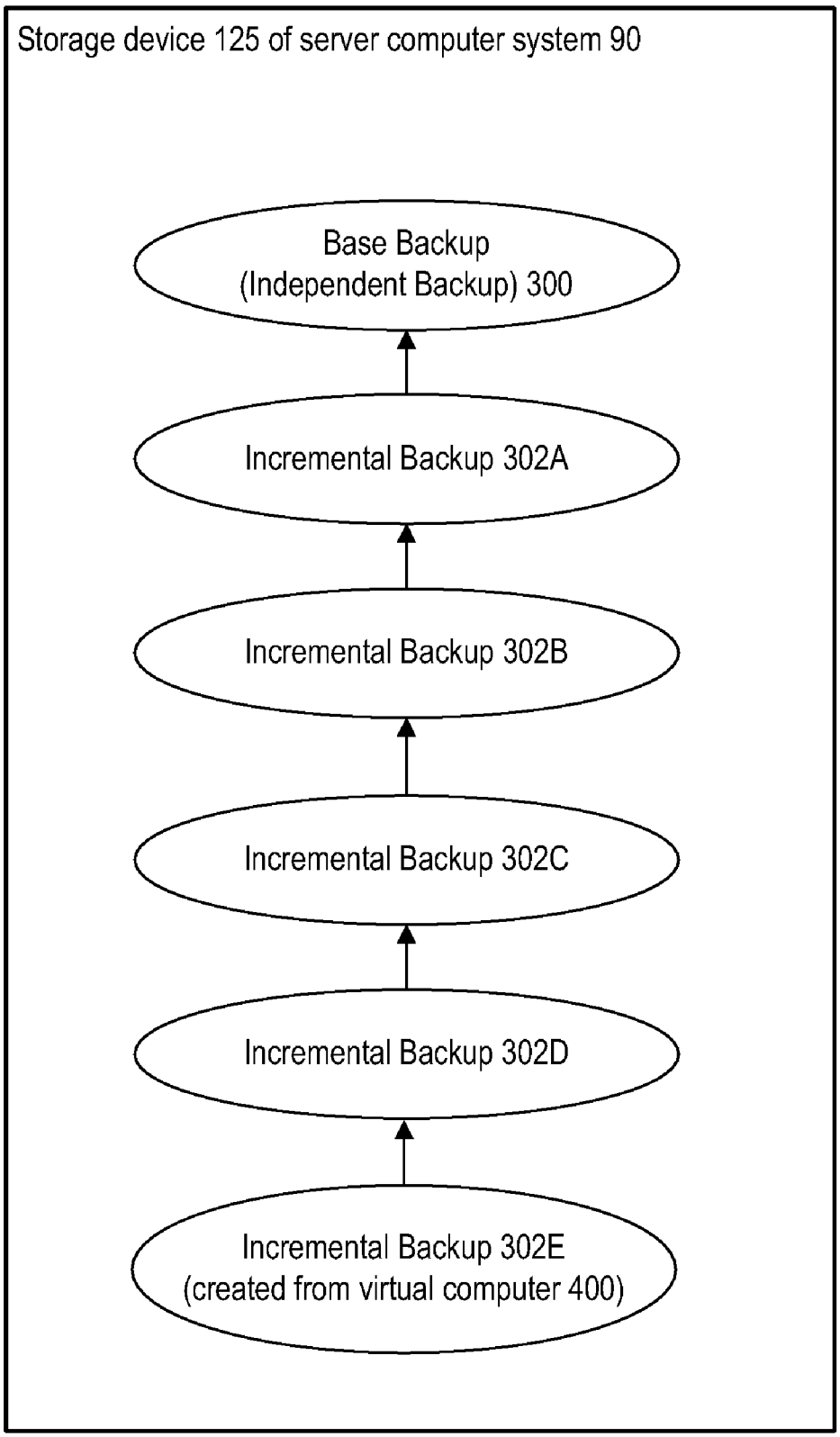
FIG. 10 illustrates the example of FIG. 7, in which a new backup image has been created from a virtual computer and stored as an incremental backup image on the server computer system.

As described above, in some embodiments backup images may be stored on the server computer system 90 as a chain of incremental backup images 302 based on a base backup image 300. In some embodiments the new backup image created from the virtual computer 400 may also be stored as an incremental backup image 302 based on the base backup image 300. For example, in the example of FIG. 7, the virtual computer 400 may be instantiated from the incremental backup image 302D. When the new backup image is created from the virtual computer 400, the new backup image may be created as an incremental backup image 302E which depends on the incremental backup image 302D, as shown in FIG. 10.

Figure 11:
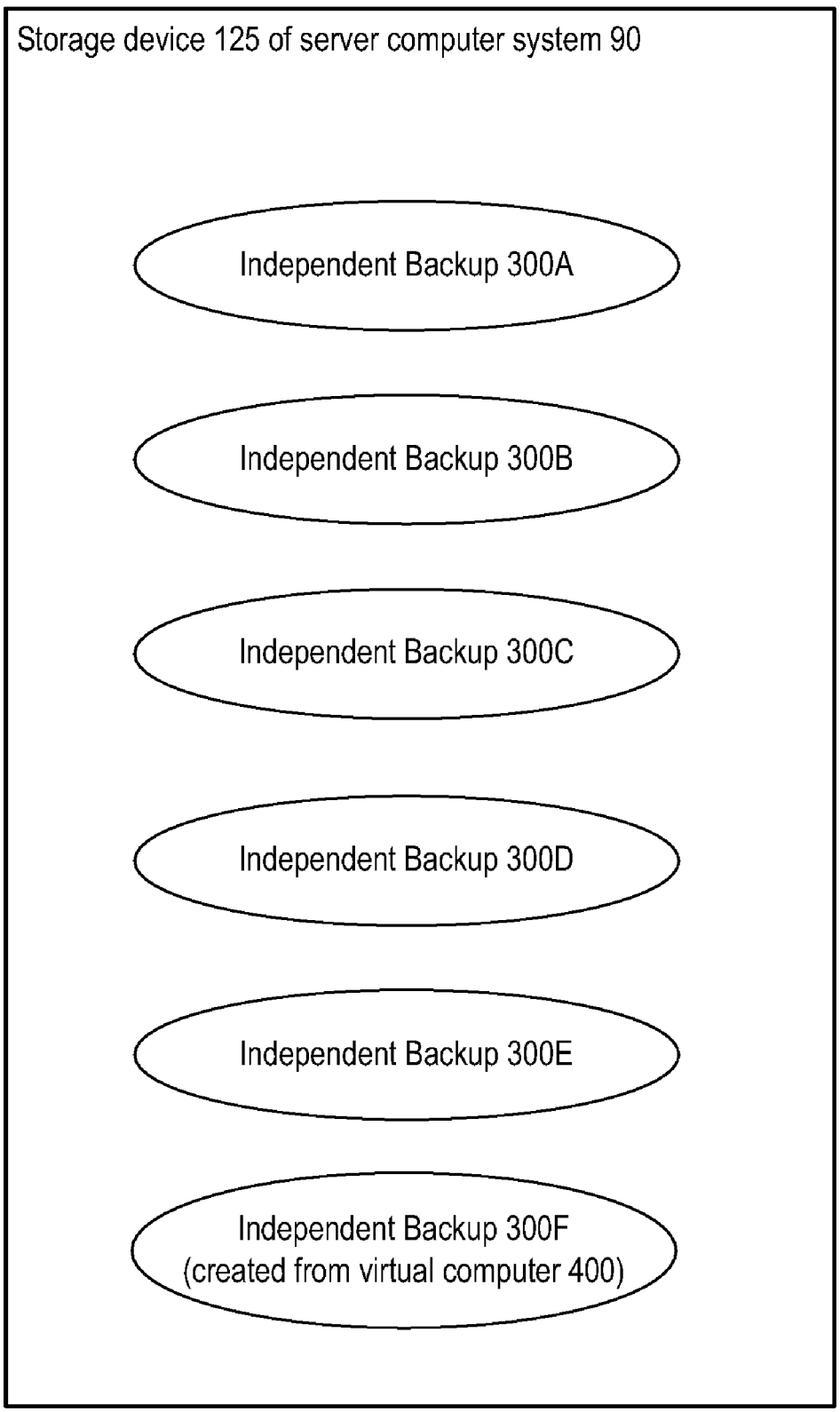
FIG. 11 illustrates the example of FIG. 8, in which a new backup image has been created from a virtual computer and stored as an independent backup image on the server computer system.

In other embodiments the new backup image created from the virtual computer 400 may be stored on the server computer system 90 as an independent backup image. For example, FIG. 11 illustrates the example of FIG. 8 in which a new independent backup image 300F has been created from the virtual computer 400 and stored on the server computer system 90.

As indicated by the arrow 7 in FIG. 6, the new backup image created from the virtual computer 400 may be transferred and applied to the user's computer system 80. For example, the image management server software 207 on the server computer system 90 may communicate with the image management client software 205 on the user's computer system 80 to send the new backup image to the user's computer system 80. In response to receiving the new backup image, the image management client software 205 may apply the new backup image to the user's computer system 80. Applying the new backup image to the user's computer system 80 may comprise updating the user's computer system 80 according to the new backup image, e.g., by modifying information stored on one or more of the storage devices 125 of the user's computer system 80 as specified by the new backup image.

Applying the new backup image to the user's computer system 80 may put the user's computer system 80 in a state corresponding to the state of the virtual computer 400 at the time the new backup image was created, i.e., the modified state of the virtual computer 400. For example, a storage device 125 on the user's computer system 80 may implement a file system, where the file system was re-created on the virtual computer 400, and where the modified state of the virtual computer 400 includes a modified state of the file system. Thus, applying the new backup image to the user's computer system 80 may automatically change the file system on the storage device 125 into the modified state of the file system on the virtual computer 400.

For example, if a new file was added to the file system on the virtual computer 400 then the new file may be automatically added to the file system on the storage device 125 of the user's computer system 80 when the new backup image is applied to the user's computer system 80. Similarly, if a file was modified in the file system on the virtual computer 400 then the corresponding file on the storage device 125 of the user's computer system 80 may be automatically modified in an identical manner when the new backup image is applied to the user's computer system 80. Similarly, if a file was deleted in the file system on the virtual computer 400 then the corresponding file on the storage device 125 of the user's computer system 80 may be automatically deleted when the new backup image is applied to the user's computer system 80.

As another example, a software application may be installed on the user's computer system 80, where the software application was re-created on the virtual computer 400, and where the modified state of the virtual computer 400 includes a modified state of the software application. Thus, applying the new backup image to the user's computer system 80 may automatically change the software application on the user's computer system 80 into the modified state of the software application on the virtual computer 400.

In some embodiments, the backup image that was created from the virtual computer 400 may be transferred and applied from the server computer system 90 to the user's computer system 80 in response to a user request. For example, after interacting with the virtual computer 400 on the client access computer system 82, the user may subsequently return to the user's computer system 80 and log on to the server computer system 90 and request that the new backup image be transferred and applied to the user's computer system 80.

In other embodiments the user may not need to manually connect to the server computer system 90 and request that the backup image created from the virtual computer 400 be transferred and applied to the user's computer system 80. For example, in some embodiments the server computer system 90 may automatically communicate with the user's computer system 80 to inform the user's computer system 80 that the new backup image was created on the server computer system 90, and the new backup image may be automatically transferred to and applied to the user's computer system 80. In other embodiments, the user's computer system 80 may automatically detect or be informed of the fact that the new backup image was created on the server computer system 90, but the user's computer system may first prompt the user asking whether he wants to apply the new backup image to the user's computer system 80 before doing so automatically.

Although the method is described above in terms of transferring and applying the new backup image that is created from the virtual computer 400 to the user's computer system 80, in other embodiments the new backup image may be transferred and applied to one or more physical computer systems other than the user's computer system 80. Thus, for example, if the user's original computer system 80 becomes lost or broken, the user may acquire a new computer system, and the new computer system may be automatically configured to the state indicated by the backup image that was created from the virtual computer 400 by transferring and applying this backup image from the server computer system 90 to the new computer system.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to implement:
    storing a plurality of backup images of a first physical computer system on a server computer system, wherein each respective backup image specifies a respective state of the first physical computer system, wherein the first physical computer system corresponds to a particular user;
    receiving a first request from the particular user via a web browser program executing on a second physical computer system to access a virtual representation of the first physical computer system;
    in response to the first request, transmitting information identifying the plurality of backup images to the second physical computer system for display by the web browser program;
    instantiating a virtual computer from a particular backup image of the plurality of backup images in response to receiving user input from the particular user selecting the particular backup image via the web browser program executing on the second physical computer system, wherein the particular backup image specifies a first state of the first physical computer system, wherein the first state includes a state of a file system of the first physical computer system, wherein instantiating the virtual computer from the particular backup image comprises converting a first one or more files of the particular backup image into a second one or more files formatted according to a virtual computer format and instantiating the virtual computer from the second one or more files;
    receiving user input from the particular user to the virtual computer via the web browser program executing on the second physical computer system;
    modifying a state of the virtual computer in response to the user input to the virtual computer, wherein the modified state includes a modified state of the file system;
    storing a modified backup image of the virtual computer on the server computer system, wherein the modified backup image specifies the modified state of the virtual computer; and
    transferring and applying the modified backup image from the server computer system to the first physical computer system, wherein applying the modified backup image of the virtual computer to the first physical computer system changes the file system of the first physical computer system into the modified state of the file system.

2. The non-transitory computer-accessible storage medium of claim 1,
    wherein applying the modified backup image to the first physical computer system puts the first physical computer system in a modified state corresponding to the modified state of the virtual computer.

3. The non-transitory computer-accessible storage medium of claim 1,
    wherein the particular backup image specifies a first state of the first physical computer system, wherein the first state includes a state of a software application on the first physical computer system;
    wherein the modified state of the virtual computer includes a modified state of the software application; and
    wherein applying the modified backup image to the first physical computer system changes the software application on the first physical computer system into the modified state of the software application.

4. The non-transitory computer-accessible storage medium of claim 1, wherein the program instructions are further executable by the one or more processors to implement:
    the server computer system transmitting graphical user interface information of the virtual computer to the second physical computer system for display by the web browser program.

5. The non-transitory computer-accessible storage medium of claim 1, wherein the program instructions are further executable by the one or more processors to implement:
    creating one or more files representing the virtual computer;
    wherein storing the modified backup image of the virtual computer comprises:
    converting the one or more files representing the virtual computer into a second one or more files formatted according to a backup format for physical devices; and
    storing the second one or more files, wherein the modified backup image comprises the second one or more files.

6. The non-transitory computer-accessible storage medium of claim 1,
    wherein the modified backup image of the virtual computer comprises an incremental backup image based on the particular backup image.

7. The non-transitory computer-accessible storage medium of claim 1,
    wherein the modified backup image of the virtual computer comprises an independent backup image not based on another backup image.

8. The non-transitory computer-accessible storage medium of claim 1,
    wherein the particular backup image includes one or more of:
        operating system information for the first physical computer system;
        device driver information for the first physical computer system; and
        information representing one or more software applications installed on the first physical computer system.

9. The non-transitory computer-accessible storage medium of claim 1, wherein the program instructions are further executable by the one or more processors to implement:
    transferring and applying the modified backup image from the server computer system to a third physical computer system.

10. A system comprising:
    one or more processors;
    memory storing program instructions; and one or more storage devices;
wherein the program instructions are executable by the one or more processors to implement:
  storing a plurality of backup images of a first physical computer system on the one or more storage devices, wherein each respective backup image specifies a respective state of the first physical computer system, wherein the first physical computer system corresponds to a particular user;
  receiving a first request from the particular user via a web browser program executing on a second physical computer system to access a virtual representation of the first physical computer system;
  in response to the first request, transmitting information identifying the plurality of backup images to the second physical computer system for display by the web browser program;
  instantiating a virtual computer from a particular backup image of the plurality of backup images in response to receiving user input from the particular user selecting the particular backup image via the web browser program executing on the second physical computer system, wherein the particular backup image specifies a first state of the first physical computer system, wherein the first state includes a state of a file system of the first physical computer system, wherein instantiating the virtual computer from the particular backup image comprises converting a first one or more files of the particular backup image into a second one or more files formatted according to a virtual computer format and instantiating the virtual computer from the second one or more files;
  receiving user input from the particular user to the virtual computer via the web browser program executing on the second physical computer system;
  modifying a state of the virtual computer in response to the user input to the virtual computer, wherein the modified state includes a modified state of the file system;
  storing a modified backup image of the virtual computer on the one or more storage devices, wherein the modified backup image specifies the modified state of the virtual computer; and
  transferring and applying the modified backup image from the one or more storage devices to the first physical computer system, wherein applying the modified backup image to the first physical computer system changes the file system of the first physical computer system into the modified state of the file system.

11. The system of claim 10,
wherein applying the modified backup image to the first physical computer system puts the first physical computer system in a modified state corresponding to the modified state of the virtual computer.

12. The system of claim 10, wherein the program instructions are further executable by the one or more processors to implement:
  the server computer system transmitting graphical user interface information of the virtual computer to the second physical computer system for display by the web browser program.

13. A method comprising:
  storing a plurality of backup images of a first physical computer system on a server computer system, wherein each respective backup image specifies a respective state of the first physical computer system, wherein the first physical computer system corresponds to a particular user;
  receiving a first request from the particular user via a web browser program executing on a second physical computer system to access a virtual representation of the first physical computer system;
  in response to the first request, transmitting information identifying the plurality of backup images to the second physical computer system for display by the web browser program;
  instantiating a virtual computer from a particular backup image of the plurality of backup images in response to receiving user input from the particular user selecting the particular backup image via the web browser program executing on the second physical computer system, wherein the particular backup image specifies a first state of the first physical computer system, wherein the first state includes a state of a file system of the first physical computer system, wherein instantiating the virtual computer from the particular backup image comprises converting a first one or more files of the particular backup image into a second one or more files formatted according to a virtual computer format and instantiating the virtual computer from the second one or more files;
  receiving user input from the particular user to the virtual computer via the web browser program executing on the second physical computer system;
  modifying a state of the virtual computer in response to the user input to the virtual computer, wherein the modified state includes a modified state of the file system;
  storing a modified backup image of the virtual computer on the server computer system, wherein the modified backup image specifies the modified state of the virtual computer; and
  transferring and applying the modified backup image from the server computer system to the first physical computer system, wherein applying the modified backup image to the first physical computer system changes the file system of the first physical computer system into the modified state of the file system.

14. The method of claim 13,
wherein applying the modified backup image to the first physical computer system puts the first physical computer system in a modified state corresponding to the modified state of the virtual computer.

15. The method of claim 13, further comprising:
the server computer system transmitting graphical user interface information of the virtual computer to the second physical computer system for display by the web browser program.

* * * * *